3,405,034
AMINOPEPTIDASE CLEAVING L-LEUCINAMIDE, HYPERTENSIN, AND OXYTOCIN
Franz Wenzel, Darmstadt, Helmut Uhlig, Rossdorf uber Darmstadt, and Klaus Lehmann, Darmstadt, Germany, assignors to Rohm & Haas G.m.b.H., Darmstadt, Germany
No Drawing. Filed May 4, 1965, Ser. No. 453,208
Claims priority, application Germany, May 9, 1964, R 37,859; Apr. 17, 1965, R 40,416
5 Claims. (Cl. 195—62)

ABSTRACT OF THE DISCLOSURE

An aminopeptidase cleaving L-leucinamide, hypertensin, and oxytocin. The enzyme is isolated by heating an aqueous cobaltic solution of peptidases and proteinases precipitated from a culture filtrate of a mold fungus variant whose enzymes cleave L - leucine - p - nitranilide and L - cystine - bis - p - nitranilide.

---

The present invention relates to a method of preparing an iminopeptidase capable of cleaving L-leucinamide, hypertensin, and oxytocin, and to the aminopeptidase so produced.

It is known from the work of T. Akatsuka and M. Sato, Bull. Agr. Chem. Soc. Japan, 23, 465–474 (1959) and 27, 71–75 (1963), that various Aspergilli grown on a culture medium of skim milk and glucose produce an amino polypeptidase in addition to other proteases. The amino polypeptidase in particular cleaves L - leucyl-glycyl-glycine, but neither L - leucinamide nor L-leucyl-glycine.

It has now been found that mold fungi, particularly strains from various Aspergilli, produce an aminopeptidase which is identical neither with that isolated by Akatsuka and Sato, nor with the leucine aminopeptidase produced from pig kidneys. ["The Enzymes," edited by Boyer, Lardy, and Myrbäck, Academic Press, New York and London, 4, 37–62 (1960)]. The mold fungi include various Aspergilli known for the technical preparation of proteases, such as *Aspergillus oryzae, sojae, parasiticus, melleus,* and *flavus,* as well as mold fungi such as *Rhizopus niveus, Trichoderma koningi,* and *Penicillium citrium.* The preparation of this previously undiscovered aminopeptidase is the object of the present invention.

First, from strains of the above-mentioned mold fungi, those variants are chosen whose enzymes cleave L-leucine - p - nitranilide and L - crystine - bis - p - nitranilide according to the tests described by H. Tuppy, U. Wiesbauer, and E. Wintersberger in Hoppe-Seylers Zeitschrift für physiologische Chemie, 329, 278–288 (1962). It is particularly advantageous to choose strains from the mold fungi most widely used for the technical preparation of proteases, namely *Aspergillus parasiticus, oryzae, melleus,* and *flavus.* The specificity of the aminopeptidase produced from *Aspergillus parasiticus* for amino-terminated L - leucine is particularly pronounced.

From a culture filtrate of the mold fungi strains selected from the viewpoint discussed above, the aminopeptidase to be isolated is separated, together with other peptidases and proteinases, by known fractional solvent precipitation techniques, and is then removed from the liquid phase by centrifugation or filtration. Exemplary precipitation techniques will be evident from the specific examples herein.

The enzyme mixture obtained is then dissolved in water and is heated for at least one hour at 60° C. after addition of a cobalt salt. It is surprising that all of the enzymes accompanying the aminopeptidase to be isolated are inactivated by such long heating, as would be expected, but that the enzyme sought nevertheless remains in an active form.

This enzyme can next be isolated from the aqueous solution by salting out or by solvent precipitation, and can be used as a raw or crude product in various technological processes. The preparation of a pure, electrophoretically uniform, product, suitable for example for diagnostic or therapeutic uses, is accomplished by known chromatographic techniques, for example on cellulose or dextrane gel exchangers having functional groups such as diethylaminoethyl groups.

The procedure described above has the advantage that by fractional solvent precipitation, an enrichment of the aminopeptidase to be isolated is achieved. Also, the proteases remaining in solution can subsequently be recovered. Fundamentally, it is possible to omit the precipitation carried out for purposes of enrichment, to add a cobalt salt directly to the culture filtrate, and to inactivate thermally all of the enzymes in the solution except the aminopeptidase to be isolated. This process, however, is, from economic considerations, a less desirable mode of carrying out the object of the present invention.

In contrast to the aminopeptidase isolated by Akatsuka and Sato, the enzyme prepared according to the present invention cleaves L-leucinamide. Further characteristics useful in distinguishing the material include the capacity of the aminopeptidase of the invention to cleave, in a technically and pharmacologically useful manner, the labor-inciting hormone oxytocin and also angiotensin II, capable of raising the blood pressure. That is, these physiologically significant polypeptides can be inactivated by administration of the aminopeptidase prepared according to the present invention when this is necessary for medicinal reasons. Thus, in vivo a mechanism can be set it motion which otherwise can be effected only by highly specific bodily enzymes or enzyme systems. The effect of the aminopeptidase on oxytocin can be demonstrated in the isolated rat uterus. Its effect on angiotensin II can be shown in vitro on a pure polypeptide and also in vivo in a spinalized cat.

The aminopeptidase prepared according to the present invention can also be used for sequential analysis or for the degradation of polypeptides on a preparatory scale. Together with proteinases, the material is suitable for degradation of proteins to low molecular weight peptides or amino acids.

A better understanding of the present invention and of its many advantages will be had from the following specific examples, given by way of illustration.

Example 1

10 liters of a culture filtrate of a technical culture of *Aspergillus oryzae* were combined with the same volume of pre-cooled acetone over a period of 30 minutes at 0° to 5° C. with stirring. The mixture was centrifuged after a further 30 minutes. The precipitate was washed several times with 50% aqueous acetone, finally with pure acetone, and air dried. The yield was 69 gms. The product was immediately extensively dissolved in 1.4 liters of distilled water, and an inactive material was precipitated at 0° C. with stirring with 600 milliliters of acetone. This was removed by centrifugation together with any undissolved starting material. A further 550 ml. of acetone were added to the clear solution, the precipitate was separated by centrifugation, and washed with acetone. After drying, 8 gms. of a material having a specific activity of $E=350/g.$ were obtained. The activity yield was 89%, calculated upon the culture liquors.

A 1% solution of this pre-purified aminopeptidase was next prepared in a $10^{-3}$ molar cobalt acetate solution. Activated charcoal was added to the solution for decolorization. The solution was heated for 90 minutes on a water bath at 60° C., cooled to from 0° to 5° C., and, as described in the previous paragraph, fractionally precipitated with acetone. The aminopeptidase separated on addition of from 35 to 55 volume percent of acetone in a yield of 2.4 gms. from 7 gms. The specific activity of the preparation was $E=664/g$. The activity yield was 63%.

For chromatographic purification, a solution of 1 gm. of the heat-treated peptidase, in 40 ml. of M/15 phosphate buffer at a pH of 7.6, was passed through a glass tube 2 centimeters in diameter and 50 centimeters long filled to a height of 40 centimeters with DEAE-cellulose which had been equilibrated in M/15 phosphate buffer at a pH of 7.6. The material was eluted with a M/15 phosphate buffer to which 0.05 mol per liter of NaCl had been added. Inactive protein and other impurities were eluted between 100 and 200 ml. or remained fixed on the column. The peptidase appeared in the eluate between 200 and 400 ml. This fraction was dialyzed and was lyophilized after the addition of 10% by volume of an M/15 phosphate buffer at pH 7.6. The aminopeptidase obtained in this manner was electrophoretically uniform. The specific activity was $E=6300/g$. protein. The activity yield in the eluate was 63%.

Example 2

The treatment of a culture filtrate (1550 ml.) of *Aspergillus parasiticus* proceeded as Example 1 herein with the difference that, in the fractional precipitation with acetone, the aminopeptidase separated between 35 and 50% of acetone. After heat treatment as in Example 1, 1.15 gms. of a preparation having a $E=950/g$. was obtained. The activity yield, calculated on the culture filtrate, was 82%.

For further purification, the material was chromatographed on DEAE-Sephadex A 50. The dextran gel, which had been equilibrated with an M/15 phosphate buffer at pH 7.6, was filled in a glass tube of 2 centimeters diameter to a height of 40 centimeters. 1.0 g. of the heat-treated peptidase dissolved in 30 ml. of phosphate buffer was added to the colum. Elution followed with 550 ml. of M/15 phosphate buffer at a pH of 7.6 and finally with a sodium chloride gradient produced by continuously dropping and mixing 1 M sodium chloride solution in 300 ml. of M/15 phosphate buffer. The peptidase was obtained in the eluate after a total elution volume of 700 ml. to 800 ml., was dialyzed, and was then lyophilized after addition of 10% by volume of M/15 phosphate buffer at pH 7.6. The specific activity of the electrophoretically uniform aminopeptidase amounted to $E=4000/g$. protein. The activity yield in the eluate was 56%.

In the examples, enrichment was followed by measuring the enzymatic activity of the aminopeptidase with L-leucine-p-nitranilide as a substrate in $1.66\times10^{-3}$ molar solution at 30° C. and pH 8.0 according to Tuppy. As the unit (E) of enzymatic activity is meant that amount of substrate, in micromoles, which is cleaved per minute by the enzyme.

What is claimed is:

1. A process for the preparation of an aminopeptidase cleaving L-leucinamide, hypertensin, and oxytocin, which process comprises precipitating a mixture of peptidases and proteinases from a culture filtrate of a mold fungus variant whose enzymes can cleave L-leucine-p-nitranilide and L-cystine-bis-p-nitranilide, dissolving said mixture in water, heating the solution for at least one hour at about 60° C. in the presence of a cobalt salt, and then recovering said aminopeptidase from the solution.

2. A process as in claim 1 wherein said mold fungus variant is an Asperigillus variant.

3. A process as in claim 1 wherein said mold fungus variant is a variant of a fungus selected from the group consisting of *Aspergillis parasiticus, A. oryzae, A. melleus,* and *A. flavus.*

4. A process as in claim 1 wherein the aminopeptidase recovered is further purified by chromatography to obtain an electrophoretically uniform product.

5. An aminopeptidase prepared according to claim 1, said aminopeptidase being less than about 30 percent inactivated by heating for 90 minutes at 60° C. with $10^{-3}$ M cobalt ion.

References Cited

Akatsuka et al., Bull. Agr. Chem. Soc. Japan 27, No. 2, pp. 71–75 and No. 12, pp. 828–835 (1963).

Patterson, et al., Journal of Biological Chemistry 238, No. 11, pp. 3611 to 3620.

LIONEL M. SHAPIRO, *Primary Examiner.*